April 8, 1924.  
L. C. SLAY  
WINDSHIELD WIPER  
Filed Oct. 26, 1921. 2 Sheets-Sheet 1

Inventor  
Louis C. Slay

By Whittemore, Hulbert, Whittemore, and Belknap  
Attorney

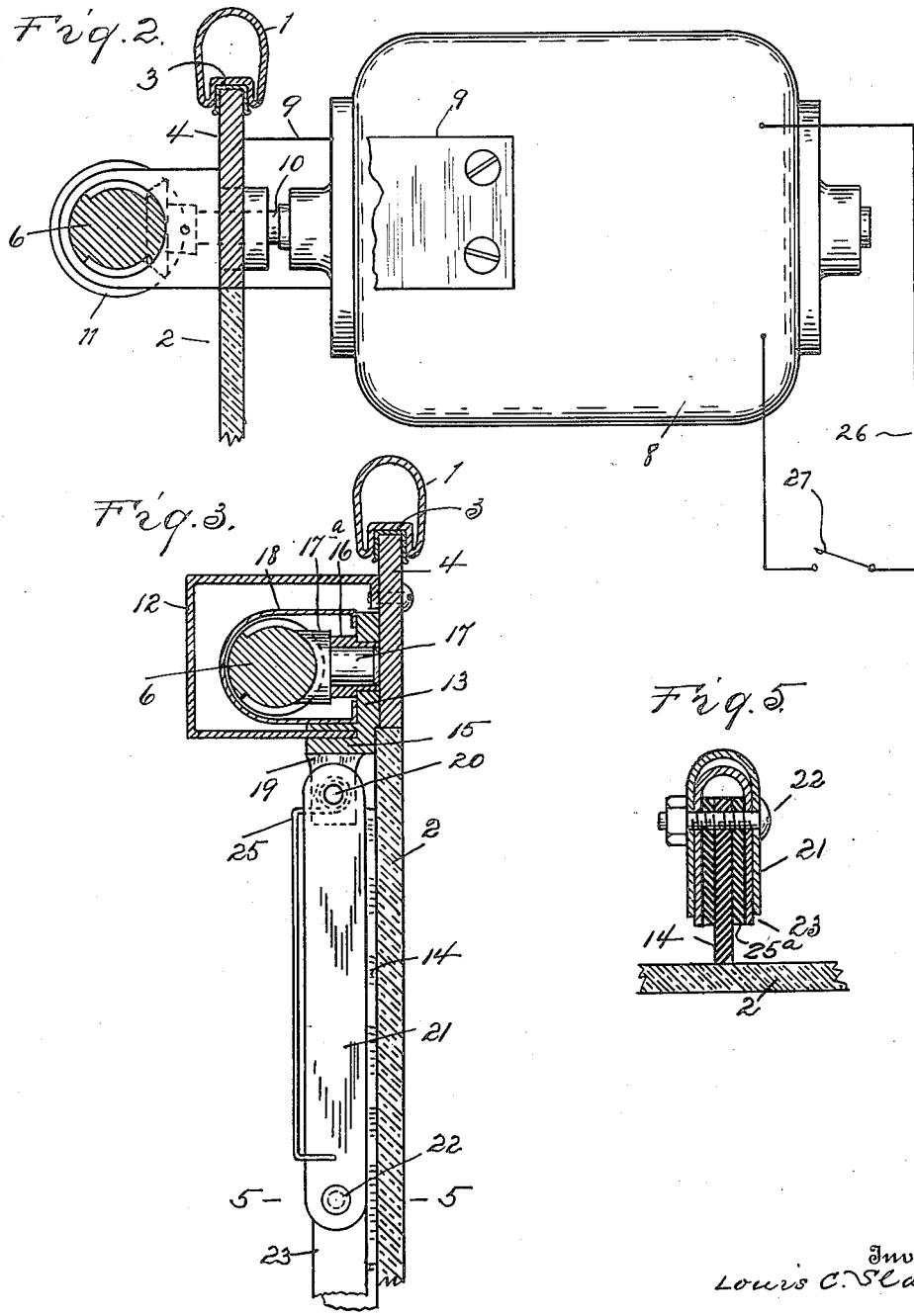

Patented Apr. 8, 1924.

1,489,366

UNITED STATES PATENT OFFICE.

LOUIS C. SLAY, OF DETROIT, MICHIGAN.

WINDSHIELD WIPER.

Application filed October 26, 1921. Serial No. 510,437.

*To all whom it may concern:*

Be it known that I, LOUIS C. SLAY, a citizen of the United States of America, residing at Detroit, in the county of Wayne and State of Michigan, have invented certain new and useful Improvements in Windshield Wipers, of which the following is a specification, reference being had therein to the accompanying drawings.

This invention relates to windshield wipers and more particularly relates to power actuated windshield wipers.

It is the object of the invention to provide a unitary arrangement of windshield wiper motor and control mechanism which arrangement may be installed upon a windshield without materially obstructing the view and without requiring special tools or a high degree of mechanical skill.

A further object of the invention is elimination of the added cost, increased complexity and difficulty of installation involved by the employment of a drive connection to a wiper from the engine of the vehicle.

The invention is illustrated in a preferred form in the accompanying drawings wherein:—

Figure 2 is a vertical sectional view of the same, the section being taken upon line 2—2 of Figure 1;

Figure 3 is a vertical section taken upon line 3—3 of Figure 1;

Figure 5 is a cross section view of a wiper member.

Figure 1:
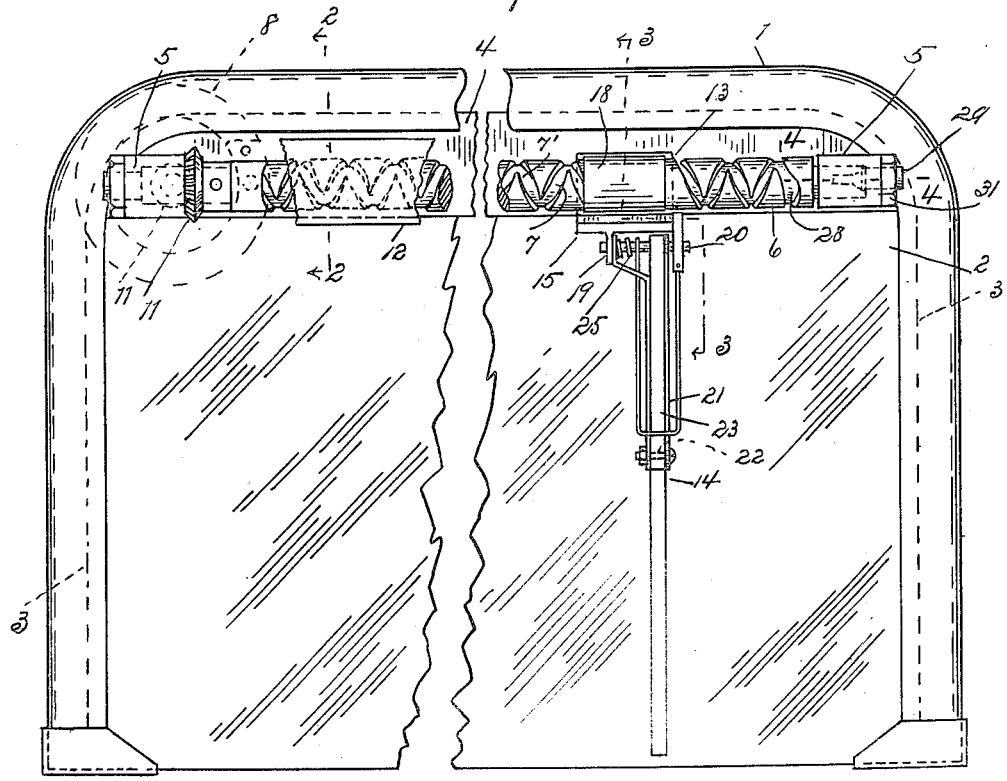
Figure 1 is a front view of a windshield equipped with the improved wiper.
Figure 4:
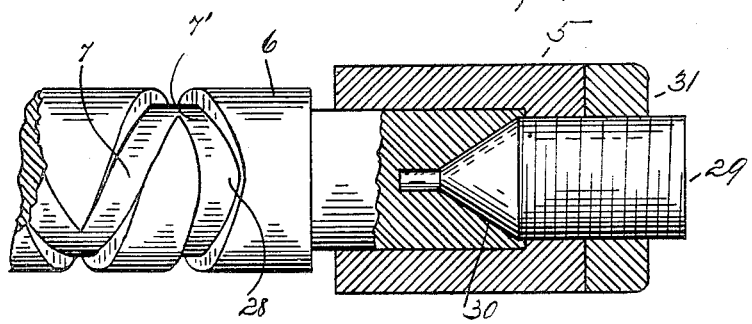
Figure 4 is a sectional detail of a cam shaft bearing taken upon line 4—4 of Figure 1.

In these views the reference character 1 designates the frame and 2 the glass of the upper section of a windshield, said frame having the customary channel 3 for receiving the glass. The present invention eliminates a strip of the glass 2 in proximity to the top of the frame 1, substituting for said strip a metal plate 4 having preferably the same thickness as the glass and held in place by engagement at its top and ends with the channel 3 of the frame. Upon the front face of said plate adjacent the ends thereof, bearings 5 are mounted fast, and there are journaled in said bearings the ends of a cam shaft 6 formed with reverse spiral grooves 7 and 7'. Said shaft is adapted to be driven by an electric motor 8, the latter being mounted rearwardly of the windshield upon a bracket 9 bolted to one end of the plate 4, the shaft 10 of said motor being extended forwardly through the plate transversely thereof and having drive connection with the cam shaft 6 through a pair of beveled gears 11. 12 is a sheet metal housing secured to the plate 4 and inclosing the cam shaft 6 and gears 11 to protect the same from the weather. Said housing is riveted or otherwise secured at its upper edge to the plate 4, its lower edge being slightly spaced forwardly from said plate. 13 is a carriage for a wiper 14, said carriage having an engagement with the cam shaft 6 whereby, when said shaft is driven, the carriage is reciprocated back and forth across the windshield, engaging the wiper 14 with the entire area of the glass and keeping the latter substantially free from rain, snow or dust. Said carriage comprises a metal plate bearing against the front of the plate 4 and having a lower end 15 bifurcated to embrace the lower edge of the housing 12. Thus the plate 4 and housing 12 jointly form a guide for the carriage 13 in the sliding travel thereof. 16 is a bushing projecting from the carriage toward the shaft 6 and rotatively mounting a pin 17, having a head 17$^a$ engaging in one or other of the grooves 7 and 7', said head being fashioned to conform to the pitch of said groove. 18 is a U-shaped tie member rigidly secured to the carriage 13 and embracing the shaft 6 to prevent the latter from springing out of proper engagement with the head 17$^a$. A pair of spaced lugs 19 integrally projecting downwardly from the carriage carry a pin 20 upon which is swung a pair of downwardly projecting spaced arms 21. Between said arms the wiper 14 is pivoted by means of a pin 22 passing through the free ends of said arms and through the center of said wiper. The latter may be of any suitable construction, and as shown comprises a U-shaped holder 23 which may be formed of sheet metal and a rubber wiping element retained within said holder. 25 is a wire spring coiled upon the pin 20 and bearing upon the free ends of the arms 21 to hold the wiper in proper contact with the glass 2. It is preferred to clamp the wiping element between rubber strips 25$^a$ to somewhat increase the resilient play of said element.

In the operation of the described invention the circuit 26 of the motor 8 is closed, when desired, by a switch 27 having any convenient location upon the vehicle. The shaft 6, being driven by said motor, will effect a reciprocation of the wiper 14 back and forth across the windshield, maintaining the latter in proper condition for clear vision. It is to be observed that the two grooves 7 and 7' are connected at their extremity as is indicated at 28 in Figure 1, the width of said grooves at this point being slightly increased so as to allow the necessary angular movement of the head 17ª in passing from one groove into the other. Also the head 17ª is so proportioned in length as to insure against any such turning of said head as would permit the latter to escape from one of the grooves into the other in passing the crossing points of the grooves.

The unitary mounting of the entire apparatus upon the plate 4 renders the installation of the device upon any vehicle an extremely simple matter that may be taken care of, if desired, by the unskilled purchaser of the device. To prevent lost motion and any consequent rattle, it is preferred to equip each bearing 5 with a cone headed adjusting screw 29 axially mounted in said bearing and engaging a conical seat 30 in the corresponding end of the shaft 6. A lock nut 31 is mounted upon each adjusting screw 29 and clamps against the corresponding bearing 5 to maintain the proper position of said screw. Thus any longitudinal play of the cam shaft may be eliminated without restraining the shaft from free rotation.

What I claim as my invention is:—

1. In a device of the character described, the combination with a windshield comprising a grooved frame, and a glass engaging in the groove of said frame, a plate engaging in the groove of said frame above the glass, a shaft journaled upon said plate, a motor mounted upon the plate and having a drive connection with said shaft, a wiper for said windshield, and a support for said wiper actuable back and forth across the glass, through engagement with said shaft.

2. In a device of the character described, the combination with a windshield comprising a grooved frame, and a glass plate engaging in the groove of said frame, of a mounting plate engaging in the groove of said frame above the glass, a motor upon said mounting plate and a traveling wiper mounted upon said plate and actuable by said motor.

3. In a device of the character described, the combination with a windshield comprising a grooved frame and a transparent plate engaging in the groove of said frame, of a mounting plate retained in the groove of said frame above the glass, a shaft journaled on said plate and extending across the windshield, means for driving said shaft, and a wiper actuable through rotation of said shaft.

4. A wiper, comprising a U-shaped holder, a flexible wiping element clamped in said holder and separate flexible reinforcements arranged respectively between said wiping element and the jaws of the holder.

5. In a device of the character described, the combination with a windshield comprising a transparent plate, and a frame for said plate including a portion extending above the plate, of a wiper for said plate reciprocatory across the windshield, and a mounting for said wiper disposed between the top of said frame and the glass in the plane of the latter and substantially co-extensive in a horizontal direction with said plate.

In testimony whereof I affix my signature.

LOUIS C. SLAY.